Patented Feb. 26, 1946

2,395,649

UNITED STATES PATENT OFFICE 2,395,649

PROCESS FOR PREPARING CHLOROPRENE-ACRYLIC NITRILE POLYMERS

Frederick C. Wagner, Wilmington, Del., assignor to E. I. du Pont de Nemours & Company, Wilmington, Del., a corporation of Delaware No Drawing. Application March 14, 1942, Serial No. 434,785

1 Claim. (Cl. 260—84.5)

This invention relates to polymeric materials obtained from mixtures of chloroprene and acrylic nitrile. More particularly, it relates to rubber-like, polymeric materials obtained by polymerizing mixtures of chloroprene and acrylic nitrile, which materials, in the cured state, have improved resistance to the action of petroleum hydrocarbons and similar organic solvents.

It is known in the prior art that synthetic rubber-like materials may be made by polymerizing chloroprene (2-chloro-1,3-butadiene). It is further known that these materials have greater resistance to the solvent action of organic solvents than has natural rubber. However, the solvent resistance of polychloroprene is not all that might be desired under some extreme conditions. It is further known that the interpolymerization of chloroprene with unsaturated materials such as acrylic nitrile produces products which, in the cured state, have better resistance to organic solvents than polychloroprene. For example, U. S. Patent No. 2,066,331 discloses the interpolymerization of chloroprene and acrylic nitrile. At the time of that invention, it was not known how to produce plastic polymers of chloroprene in high yields and the technique used for the interpolymerization with nitrile was no better than the technique for chloroprene alone. A number of patents have since issued which described improved technique for polymerizing chloroprene. There are also patents which disclose desirable technique for polymerizing acrylic nitrile alone, such, for example, as U. S. Patent No. 2,140,048. The technique of the latter patent is entirely unsatisfactory when applied to the interpolymerization of chloroprene and acrylic nitrile. Moreover, the technique of the patents in the art dealing with the polymerization of choloprene alone or in the presence of modifiers is not satisfactory for large-scale commercial production of interpolymers of chloroprene and acrylic nitrile both because of low yields and because of lack of desirable processing properties in wet condition of the products. Moreover, while the solvent resistance of cured products made from chloroprene and acrylic nitrile according to the disclosure of U. S. Patent No. 2,066,331 is greater than that of polychloroprene alone, further improvement is still desirable.

It is an object of this invention to provide a process for the manufacture of plastic interpolymers of chloroprene and acrylic nitrile in which the interpolymers are produced in good yields and have good working properties. A further object is to produce interpolymers having improved resistance to solvents in the cured state. Other objects will appear hereinafter.

It has been found that the solvent resistance of cured chloroprene/acrylic nitrile interpolymerization products is proportional to the amount of combined acrylic nitrile in the interpolymer. It has further been found that the amount of acrylic nitrile in the interpolymer can be increased by beginning the polymerization with only a portion of the chloroprene and adding the remaining of the chloroprene during the polymerization. It has still further been found that a relatively uniform product having a high percentage of combined acrylic nitrile by comparison with the percentage of acrylic nitrile monomer used in the process can be obtained by maintaining the proportion of monomeric chloroprene to monomeric acrylic nitrile substantially constant during polymerization. Theoretically, this would require the constant addition of chloroprene as the polymerization proceeds. However, it has been found that, for practical purposes, the chloroprene may be added stepwise, and as few as four additions have been found to be satisfactory.

It has furthermore been discovered that the working properties of the product can be greatly improved where the addition of a mercaptan of the group consisting of octyl and xylyl mercaptans to the polymerization mass. Moreover, it has been discovered that the presence of a small amount of sulfur during the polymerization produces a superior product and that the resistance to swelling in the presence of organic solvents is still further increased by the presence of a small amount of sulfur dioxide in the polymerization mass.

The following examples are given to illustrate preferred embodiments of the invention. Example I illustrates a preferred method of addition of the chloroprene wherein it is added stepwise during polymerization, the amount being decreased with each addition and so adjusted that, with each addition, the original ratio of the two monomers is substantially restored. Example II illustrates an embodiment of the invention wherein the unpolymerized acrylic nitrile is utilized by the addition of a butadiene hydrocarbon, and continuing the polymerization in the dispersion, thereby rendering unnecessary the removal of the excess acrylic nitrile from the mass. The subject matter illustrated in Example II has been included in a co-pending application Serial No. 526,479, filed March 14, 1944.

The parts used, unless otherwise designated, are by weight.

Example I 27.5 parts of acrylic nitrile were emulsified in 150 parts of water containing 1 part of glacial acetic acid, 4 parts of the sodium salts of sulfated oleyl acetate and 0.5 part of the sodium salts of the dinaphthylmethane sulfonic acids made from naphthalene sulfuric acid and formaldehyde according to U. S. Patent 1,366,759. 72.5 parts of chloroprene containing in solution 0.5 part of sulfur and 0.15 part of xylyl mercaptan (prepared by the reduction of commercial xylene sulfone chloride) are added in 7 parts of gradually decreasing size calculated so as to maintain an approximate constant ratio of unpolymerized acrylic nitrile and unpolymerized chloroprene. The temperature of polymerization was maintained at 40° C.

18.5 parts of the chloroprene solution were added at the start, 13 when the density reached 0.993, 11 when the density reached 1.013, 9.5 at 1.026, 8 at 1.036, 7 at 1.044, and the remainder when the density reached 1.049. The polymerization was then continued to a density of 1.058. These densities in each case indicated that substantially all of the monomeric chloroprene had been polymerized. The addition in each case was made at least as soon as all of the monomeric chloroprene in the mass had been polymerized. The resulting dispersion of rubber-like polymeric material was treated with 2 parts of tetraethyl thiuram disulfide, dissolved in 2 parts of benzene, and dispersed in 20 parts of an emulsifying solution of the same composition as used for dispersing the polymerizable material. This dispersion was then coagulated by the addition of saturated sodium chloride solution. The coagulum was coherent and plastic. It was washed with warm water on a corrugated mill and then dried on a smooth mill, giving an 84% yield of plastic polymer containing 18.2 percent of combined acrylic nitrile. Fifty-five (55) percent of the nitrile was, therefore, utilized. Analysis of samples at various steps of polymerization indicated that substantially uniform proportion of acrylic nitrile in the interpolymer were obtained throughout the process. 100 parts of this product was compounded in the usual way with 2 parts of phenyl alpha naphthylamine, 28 parts of a semi-reinforcing carbon black, 20 parts of litharge and 10 parts of zinc oxide and cured for 30 minutes at 153° C. It gave a tensile strength of 4550 lbs./sq. in. and showed a percentage volume increase of 13.8 in kerosene in 2 days at 100° C.

By comparison, even when a higher percentage of acrylic nitrile, 30 parts with 70 parts of chloroprene was used, but all the chloroprene was added at the start of the polymerization and the conditions were otherwise substantially the same, the yield was only 77% and only 28% of the acrylic nitrile was utilized.. The percentage volume increase of that product in kerosene in 2 days at 100° C. was 28%. It will be noted that, although the proportion of nitrile employed was somewhat less than in Example I, the method of adding the chloroprene of Example I almost doubled the proportion of the acrylic nitrile utilized, and the kerosene absorption was reduced by about one-half (½). Similarly, when 70 parts of chloroprene and 30 parts of acrylic nitrile were used and the former was added to the polymerizing mixture in increments of gradually increasing size, so that the constant ratio between unpolymerized acrylic nitrile and unpolymerized chloroprene was not maintained, the results, although better than when all of the chloroprene was added at once, where poorer than when a constant ratio was maintained. Thus the product by such procedure contained only 15.4% of combined acrylic nitrile, representing a utilization of only 43%. This product increased in volume in kerosene 19%.

The unpolymerized acrylic nitrile, which is present after the density of 1.058 is reached and which appears in the serum after coagulation of the interpolymer, may be utilized without removing by adding an amount of butadiene hydrocarbon sufficient to interpolymerize therewith, as more particularly described hereinafter and illustrated in Example II.

While the process described is applicable to the polymerization of chloroprene and acrylic nitrile in all proportions, it is particularly desirable for obtaining rubber-like materials having high resistance to swelling in organic solvents in the cured state. Therefore, it is preferred that the proportion of monomeric acrylic nitrile to the total of monomeric material used shall be between 15 and 40 per cent. Especially preferred are processes wherein monomeric acrylic nitrile represents from 20 to 30 per cent of the total polymerizable material and wherein the product contains at least 10 per cent and preferably more than 15 per cent of combined acrylic nitrile.

It is preferred to add the chloroprene at various stages of the polymerization and at such a rate that the ratio of monomeric chloroprene to monomeric nitrile is maintained substantially constant. This procedure is ideally carried out by a constant addition of chloroprene monomer to the system. However, it has been found that the addition of the chloroprene in from 4 to 7 portions produces highly satisfactory results.

While the invention has been discussed thus far with regard to acrylic nitrile, other unsaturated nitriles which are capable of interpolymerizing with chloroprene can also be used, such, for example, as methacrylic nitrile.

While this invention is concerned with the interpolymerization system of chloroprene and nitriles of the acrylic nitrile type, systems containing small amounts of other polymerizable materials are within the scope of the invention. For example, small amounts of butadiene, isoprene, dimethyl butadiene, styrene, monovinylacetylene, and esters of acrylic acid may be present in the system. Although it is impossible to draw a strict line as to the amount of other polymerizable materials which can be tolerated, in general it may be said that the additional polymerizable material should not exceed the amount of monomeric acrylic nitrile present. Moreover, the acrylic nitrile and other polymerizable material together should not exceed the amount of chloroprene used.

It will be seen that a proportion of the acrylic nitrile remains unpolymerized at the end of the reaction although this amount is greatly decreased by regulation of the addition of the chloroprene. The unreacted acrylic nitrile can, of course, be recovered for reuse by distillation or by extraction of the serum resulting from the coagulation of the polymer. It has been found possible, however, to utilize this acrylic nitrile without removing it from the dispersion of the polymerized products by adding a butadiene hydrocarbon such as butadiene or isoprene and continuing the polymerization in the dispersion. By this procedure, practically all of the acrylic nitrile may be converted into an interpolymer with the butadiene hydrocarbon. This interpolymer, which remains in admixture with the acrylic nitrile-chloroprene product already formed, is itself resistant to solvents and consequently does not substantially reduce the solvent resistance of the chloroprene-nitrile product already formed. The following example illustrates the procedure:

*Example II*

Seventy (70) parts of chloroprene and 30 parts of acrylic nitrile were polymerized with the same quantities of sulfur and water as in Example I, but with 0.25 part of xylyl mercaptan, 10 parts of the sodium salts of sulfonated oleyl acetate as the dispersing agent, 0.23 part of hydrochloric acid, except that each of the four equal additions of chloroprene was allowed to polymerize only 90 per cent before the next addition. After the last addition was 90 per cent polymerized, the dispersion was made alkaline with ammonium hydroxide, 0.3 part of potassium persulfate was added and 17.5 parts of isoprene containing 0.17 part of amyl mercaptan were emulsified in the dispersion which already contained the chloroprene-acrylic nitrile interpolymer and unchanged acrylic nitrile. The polymerization was then allowed to continue until most of the acrylic nitrile and isoprene were consumed. The dispersion was then stabilized, coagulated, and worked up as in the preceding examples. The proportion of butadiene hydrocarbon added under other conditions may, of course, be varied. It is ordinarily preferred, when isoprene is used to complete the polymerization, to add a weight approximately equal to the weight of unchanged acrylic nitrile to be polymerized.

The coherence of the coagulum and the plasticity of the product are improved by the addition of certain mercaptans. Any of the isomeric octyl or xylyl mercaptans may be used as may any mixtures of these mercaptans. For example, it is often convenient to use mixtures of isomeric xylyl mercaptans obtained by reduction of the mixture of sulfonyl chlorides obtained from commercial xylene. Ordinarily, from 0.05 to 0.25 per cent of mercaptan based on total weight of polymerizable material is quite satisfactory. While higher amounts of mercaptan can be used in cases where still greater plasticity is desired, they decrease in tensile strength of the cured product. Sulfur is preferably present in the polymerization mass as disclosed in the examples. The sulfur may be present in proportions up to the maximum amount soluble in the polymerizable materials as is discussed in U. S. Patent No. 2,264,173. For most purposes, between one-fourth (¼) and three-fourths (¾) of one per cent (1%) based on the amount of polymerizable material present will be found satisfactory.

Sulfur dioxide present during the polymerization considerably increases the solvent resistance of the product, presumably as a result of chemically combining with the polymeric material. The presence during polymerization of 5 per cent of sulfur dioxide or less (based on the total weight of polymerizable material) will cause noticeable improvement in solvent resistance which will increase as the amount of sulfur dioxide used is increased. When more than about 20 per cent is used, however, the resulting product, although having excellent solvent resistance, will begin to lose in resilience and related rubber-like properties.

Any of the emulsifying agents which have been disclosed in the prior art for obtaining dispersions of chloroprene may be used. The sodium salts of sulfated higher alcohols and of compounds containing alcoholic groups are usually preferred. Examples of these are the sulfated oleyl acetate used in the above examples and the sulfate esters of long-chain alcohols such as octadecyl, cetyl, and oleyl alcohols. Sulfonated naphthalene compounds with aliphatic sidechains may be used as in the example to improve the stability of the dispersions during polymerization. If an alkaline dispersion is required, the soluble soaps of fatty acids such as sodium and ammonium oleate may be used to advantage. It is ordinarily convenient and satisfactory to use about a 2 per cent to about an 8 per cent solution of the emulsifying agent and to have the concentration of the dispersed phase about 40 per cent, although neither of these figures is critical and the concentrations may be varied as already discussed in the patents above referred to. The larger proportions of emulsifying agents are preferred when a salt, such as ammonium persulfate, is present. If the concentration of the dispersed phase is decreased, the nitrile content of the polymers also tends to decrease.

When polymerizing in alkaline dispersions, it is often desirable to use the well-known accelerators of the emulsion polymerization, such as ammonium, sodium, or potassium persulfate, benzoyl peroxide, or ascaridol.

The temperature of polymerization is preferably below about 40° C. Higher temperatures are operable, but are less preferred because of the difficulty of controlling the polymerization and the loss of volatile material unless closed polymerization vessels are used. Polymerization at 5° C. is not impractically slow and leads to a coagulum which is more readily processed than that prepared at 30° C.

When all of the chloroprene monomer has been used up and the procedure illustrated in Example II is not to be used, the polymerization can be conveniently stopped and an agent which will later plasticize the polymer introduced by adding a thiuram disulfide as described in U. S. Patent No. 2,234,315 above referred to. This patent also gives a number of other types of compounds which are suitable for bringing about this plasticization. If desired, an antioxidant such as the phenyl naphthylamines may be added, preferably along with the thiuram disulfide to the dispersion before coagulation.

The coagulation can be brought about by freezing or by the addition of a salt such as sodium chloride, or aluminum sulfate, or by the addition of alcohol. The precise method used, is, in general, not critical for the formation of an easily processed coagulum.

The compounding and curing of the polymers may be carried out by the procedures already discussed at length for the polymers of chloroprene in the patents above referred to. As is well known in the case of chloroprene polymers, zinc oxide is effective in bringing about the rapid conversion of the plastic polymer and is preferably used with either magnesium oxide or lead oxide. The latter is valuable where exceptionally good water resistance is desired. The reinforcing types of carbon black are valuable when considerable resistance to stretching is required. For softer products, the other types of carbon black are used.

Although the products of this invention may be generally substituted for natural rubber, it is obvious that their exceptionally high solvent resistance recommends them for applications when natural rubber is unsatisfactory, such as, for example, tubing, gaskets, and other articles which are exposed to petroleum products.

It is apparent that many widely different embodiments of this invention may be made without departing from the spirit and scope thereof, and, therefore, it is not intended to be limited except as indicated in the appended claim.

I claim:

The process for preparing a chloroprene-acrylic nitrile interpolymer which contains approximately 18.2% of combined acrylic nitrile, which interpolymer contains substantially uniform proportions of chloroprene and acrylic nitrile units throughout, and in which 27.5 parts of acrylic nitrile monomer and 72.5 parts of chloroprene monomer are employed, which comprises polymerizing with the acrylic nitrile monomer 18.5 parts of the chloroprene monomer, and, as the polymerization proceeds, adding the remaining chloroprene monomer to the polymerization mass in six portions of decreasing amounts, the first portion being added when substantially all of the chloroprene originally added has been polymerized, each addition being made at least as soon as all of the monomeric chloroprene in the mass is polymerized, the portions being decreased by such an amount that with each addition the original ratio of chloroprene-acrylic nitrile monomers is substantially restored, and stopping the polymerization when the last portion of the chloroprene monomer has been polymerized.

FREDERICK C. WAGNER.